(12) United States Patent
Nakagawa et al.

(10) Patent No.: US 6,673,496 B1
(45) Date of Patent: Jan. 6, 2004

(54) THIN LITHIUM SECONDARY CELL

(75) Inventors: Hiroe Nakagawa, Takatsuki (JP); Seijiro Ochiai, Takatsuki (JP); Syuichi Izuchi, Takatsuki (JP)

(73) Assignee: Yuasa Corporation, Takatsuki (JP)

( * ) Notice: Subject to any disclaimer, the term of this patent is extended or adjusted under 35 U.S.C. 154(b) by 0 days.

(21) Appl. No.: 09/355,391

(22) PCT Filed: Nov. 20, 1998

(86) PCT No.: PCT/JP98/05239

§ 371 (c)(1),
(2), (4) Date: Jul. 27, 1999

(87) PCT Pub. No.: WO99/28986

PCT Pub. Date: Jun. 10, 1999

(30) Foreign Application Priority Data

Nov. 27, 1997 (JP) ............................................. 9-325881
Nov. 27, 1997 (JP) ............................................. 9-325882

(51) Int. Cl.⁷ ............................. H01M 6/16; H01M 6/18
(52) U.S. Cl. ....................... 429/312; 429/311; 429/300
(58) Field of Search ............................. 429/316, 218.1, 429/300, 303, 312, 311; 252/62.2

(56) References Cited

U.S. PATENT DOCUMENTS

| | | | |
|---|---|---|---|
| 5,279,910 A | | 1/1994 | Sasaki et al. |
| 5,523,180 A | | 6/1996 | Armand et al. |
| 5,597,659 A | * | 1/1997 | Morigaki ............... 429/190 |
| 5,665,490 A | | 9/1997 | Takeuchi et al. |
| 5,773,166 A | * | 6/1998 | Matsui et al. ............. 429/212 |

FOREIGN PATENT DOCUMENTS

| | | |
|---|---|---|
| JP | 3-84808 | 4/1991 |
| JP | 3-212416 | 9/1991 |
| JP | 3-238704 | 10/1991 |
| JP | 5-41247 | 2/1993 |
| JP | 5-67475 | 3/1993 |
| JP | 5-178948 | 7/1993 |
| JP | 08-295711 | * 11/1996 |
| JP | 9-25384 | 1/1997 |
| JP | 9-185962 | 7/1997 |
| JP | 63-193954 | 8/1998 |

OTHER PUBLICATIONS

Linden. Handbook of Batteries, 2nd ed., pp. 1.3–1.4 and 36.13. 1995 (no month).*

* cited by examiner

Primary Examiner—Patrick Ryan
Assistant Examiner—Tracy Dove
(74) Attorney, Agent, or Firm—Crowell & Moring LLP

(57) ABSTRACT

A film-type lithium secondary battery in which at least one of a positive electrode (2), a negative electrode (3) and a separator (1) contains an electrolyte having a specified structure, the electrolyte having the above specified structure is composed of a liquid electrolyte and an organic polymer, the organic polymer is formed by polymerizing an organic monomer having a polymeric functional group at its molecular chain end, the organic polymer contains in its molecule a first chemical structure and a second chemical structure, the first chemical structure is at least one of an ethylene oxide structure and a propylene oxide structure, and the second chemical structure is at least one kind selected from among an alkyl structure, a fluoroalkyl structure, a benzene structure, an ether group and an ester group.

11 Claims, 6 Drawing Sheets

Reference Numeral

1 ··· Separator

2 ··· Positive electrode

3 ··· Negative electrode

4 ··· Adhesives

21 ··· Cathode composite

22 ··· Positive current collector

31 ··· Anode composite

32 ··· Negative current collector

THIN LITHIUM SECONDARY CELL

TECHNICAL FIELD

This invention relates to a film-type lithium secondary battery, and in particular to an improvement in an electrolyte for use in an electrode or a separator.

BACKGROUND ART

In recent years, portable devices such as a portable telephone, a PHS and a small personal computer etc. are undergoing remarkable development in fabrication into small-size and light-weight with a progress of electronics technology. Further, batteries serving as power supplies for use in these portable devices are also required to be built into small-size and light-weight form.

A lithium battery can be mentioned here as an example of a battery to be expected for use in such purpose. In addition to a lithium primary battery already put in practical use, studies have been made on the lithium secondary battery to be put it in practical use, and to achieve its high capacity and long service life.

A major example of such lithium battery is a cylindrical battery utilizing a liquid electrolyte. While, in the lithium primary battery, a film-type battery is also put in practical use by means of a method in which a solid electrolyte is used and a printing technology is applied. Utilizing this technology, many studies have been made to put the film-type battery into practical use in a field of the lithium secondary battery too.

Incidentally, the cylindrical battery is made up by a method in which an electrode group comprising a positive electrode, a negative electrode and a separator is inserted in a cylindrical container and then the liquid electrolyte is filled. In contrast, the film-type lithium secondary battery is made up by a method in which the positive electrode and the negative electrode are opposed each other through a separator comprising a solid-state or gel-state electrolyte composed of the liquid electrolyte and an organic polymer. In the film-type lithium secondary battery, a study is made for improving an initial capacity and a cycle life by maintaining a dissociation of lithium salt in the electrolyte and an ionic conductivity of lithium ion, by using a method for optimizing an organic polymer composing the electrolyte. A polyethylene oxide structure is known as a typical example of the organic polymer. Even if the electrolyte including the polyethylene oxide structure is used, however, a film-type lithium secondary battery has not been put in practical use, which can provide an initial capacity, a high-rate charge/discharge characteristic and a cycle life comparing with those of the cylindrical lithium secondary battery.

The following four points (1) to (4) may be mentioned for reasons of the above defects.

(1) Since the liquid electrolyte is used for the cylindrical battery, a degree of freedom of ion species in the electrolyte is large. Therefore, it is easy in the cylindrical battery to maintain the ionic conductivity of lithium ion in the electrolyte at a level sufficient for functioning as a battery. On the contrary, since the solid-state or gel-state electrolyte is used in the film-type lithium secondary battery, the degree of freedom of ion species in the electrolyte is small and the ionic conductivity of lithium ion in the electrolyte is extremely small as compared with the cylindrical battery using the liquid electrolyte. Accordingly, it is difficult in the film-type lithium secondary battery to obtain an ability equal to the cylindrical lithium secondary battery.

(2) The polyethylene oxide structure forming a typical example of the organic polymer has a good affinity for the liquid electrolyte and a property to restrict the lithium ion. Therefore, the electrolyte including the polyethylene oxide structure is superior in a liquid-holding ability but it decreases a supply of the liquid electrolyte and lithium ion to an active material and causes a lowering of the capacity, especially in a high-rate charge/discharge operation.

(3) The organic polymer having a low affinity for the liquid electrolyte offers a low property to restrict the lithium ion. For this reason, it is easy in the electrolyte including the polymer to supply the lithium ion to the active material. However, it is difficult to use the electrolyte including the polymer as the electrolyte by itself, because the electrolyte is inferior in the liquid-holding ability and can not prevent a leakage of the liquid electrolyte to outside of battery system, thus causing a lack of the liquid electrolyte in the battery system to result in a lowering of its capacity.

(4) It is easy in the cylindrical battery to control electronic isolation of the active material due to swelling of the liquid electrolyte by applying a pressure to the electrode group. On the contrary, it is difficult in the film-type battery to apply the pressure to the electrodes because the positive electrode and the negative electrode are opposed each other through the solid-state or gel-state electrolyte.

On the other hand, a study has hitherto been made in the film-type lithium secondary battery for improving the cycle life by maintaining an electronic conductivity and an ionic conductivity of the active material through means of regulation of a binder mixed in the positive electrode and the negative electrode.

Fluoride group polymers such as polyethylene tetrafluoride and polyvinylidene fluoride etc. are used for a first example of the binder. A positive electrode using this binder is made up as follows. The binder is dissolved in a volatile solvent and mixed together with a positive active material, a conductive agent and an electrolyte to get a cathode composite. The cathode composite is applied to the positive current collector. Thereafter, the volatile solvent is evaporated. The same method is applied to the negative electrode too.

An organic monomer having a polymeric functional group at its molecular chain end such as polyethylene oxide diacrylate etc. for example, is used for a second example of the binder. A positive electrode using this binder is made up as follows. The binder is dissolved in a liquid electrolyte and mixed together with a positive active material and a conductive agent to get a cathode composite. This cathode composite is applied to the positive current collector. Thereafter, the organic monomer forming the binder is polymerized. In this positive electrode, the solid-state or gel-state electrolyte formed by polymerizing the organic monomer functions also for the binder as it is. The same method is applied to the negative electrode too.

However, the film-type lithium secondary battery using the binder of first example includes the following problem. It is inevitable to completely remove the volatile solvent in order to maintain the battery performance at a level sufficient for functioning as a battery, but on the other hand it is required to avoid evaporation of a plasticizer etc. contained in the electrolyte. Therefore, difficult problems are remaining in a manufacturing process.

The film-type lithium secondary battery using the binder of second example includes the following problems: (i) The polyethylene oxide structure forming the skeleton of organic polymer has a high affinity for the liquid electrolyte and an ability to restrict the lithium ion. For this reason, the electrolyte including the polyethylene oxide structure is superior in the liquid-holding ability, but it decreases a supply of the liquid electrolyte and lithium ion to an active material and causes a decrease in the capacity especially in a high-rate charge/discharge operation. (ii) The electrolyte containing the polyethylene oxide structure has a large degree of swelling against the liquid electrolyte. Accordingly, in the electrode containing the electrolyte, an electrode composite is swelled by the liquid electrolyte at time of initial charging operation, so that the active material in the electrode is electronically isolated. Consequently, an abrupt lowering of capacity occurs with a progress of cycle. (iii) The organic polymer having a structure of low affinity for the liquid electrolyte has a low property to restrict the lithium ion. For this reason, it is easy in the electrolyte containing the polymer to supply the lithium ion to the active material. However, it is difficult to use the electrolyte including the polymer as the electrolyte by itself, because the electrolyte is inferior in the liquid-holding ability and can not prevent a leakage of the liquid electrolyte to outside of battery system, thus causing a lack of the liquid electrolyte in the battery system to result in a lowering of its capacity.

DISCLOSURE OF INVENTION

This invention is made in consideration of the above-mentioned problems, and an object of this invention is to provide a film-type lithium secondary battery which can maintain an ionic conductivity of lithium ion in an electrolyte for use in an electrode or a separator, at a level sufficient for functioning as a battery, and which is superior in all of an initial capacity, a high-rate charge/discharge characteristic and a cycle life.

This invention provides a film-type lithium secondary battery in which a positive electrode and a negative electrode are opposed each other through a separator; characterized in that at least one of the positive electrode, the negative electrode and the separator contains an electrolyte having a specified structure, the electrolyte having the above specified structure is composed of a liquid electrolyte and an organic polymer, the organic polymer is formed by polymerizing an organic monomer having a polymeric functional group at its molecular chain end, the organic polymer contains in its molecule a first chemical structure and a second chemical structure, the first chemical structure is at least one of an ethylene oxide structure and a propylene oxide structure, and the second chemical structure is at least one kind selected from among an alkyl structure, a fluoroalkyl structure, a benzene structure, an ether group and an ester group.

The above-mentioned "first chemical structure" has a high affinity for the liquid electrolyte, and the above-mentioned "second chemical structure" has a low affinity for the liquid electrolyte. Since the above both chemical structures are permitted to coexist in the organic polymer composing the electrolyte in the present invention, the respective chemical structures are subjected to phase separation into micro scale, as a whole the electrolyte is brought into a state where a liquid-holding ability is maintained and transfer of lithium ion is not impeded. As the result, an ionic conductivity can be obtained to such a level as sufficient for functioning as a battery in the electrolyte Therefore, a film-type lithium secondary battery superior in all of the initial capacity, the high-rate charge/discharge characteristic and the cycle life, can be obtained.

Consequently, according to the present invention, a film-type lithium secondary battery which can maintain the ionic conductivity of lithium ion of the electrolyte for use in the electrode or the separator, at a level sufficient for functioning as a battery, and which is superior in the initial capacity, the high-rate charge/discharge characteristic and the cycle life.

In the present invention, references are made mainly to a case where only the separator contains the electrolyte having the above specified structure and a case where only at least one of the positive electrode and the negative electrode contains the electrolyte having the above specified structure. However, references can also be made to a case where the positive electrode or the negative electrode and the separator contain the electrolyte having the above specified structure and a case where all of the positive electrode, the negative electrode and the separator contain the electrolyte having the above specified structure. Therefore, since the electrolyte having the above specified structure can be contained in a voluntary composition material, a workability in manufacture can be improved and a manufacturing cost can be reduced.

For the above organic monomer, reference can be made to (a) a monomer containing in its molecule the first chemical structure and the second chemical structure, (b) a mixture of an organic monomer containing the first chemical structure and an organic monomer containing the second chemical structure, and (c) a mixture including two or more kinds of a compound expressed by equation (I), a compound expressed by equation (II) and a compound expressed by equation (III). In concrete, the compound expressed by equation (I) may be mentioned for the above organic monomer of the article (a). Incidentally, symbols X in the equations (I) through (III) represent a j-valent connecting group, and a structure represented by equation (IV) for example may be mentioned therefor. However, the X is not limited to these structures. Therefore, allowance for selecting the organic monomer i.e. a possibility of use of this invention can be improved.

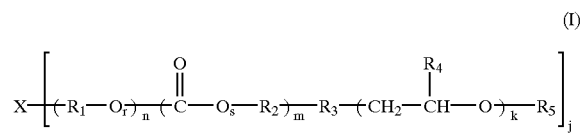
(I)

X: j-valent connecting group
$R_1$:—$C_pH_{2p}$— p=0~10
$R_2$:—$C_qH_{2q}$— q=0~10
$R_3$:—$C_tH_{2t}$— t=0~10
$R_4$:$C_vH_{2v+1}$ v=0~5

$R_5$: $CH_2=CR_6-\overset{O}{\underset{\|}{C}}-O-$  $R_6$: $C_wH_{2w+1}$  w = 0~5 r, s: s=1 when r=0, s=0 when r=1
J=1~6 m=0~3 k=1~500 n=0~20

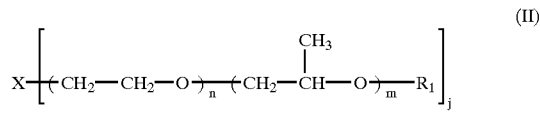
(II)

X: j-valent connecting group

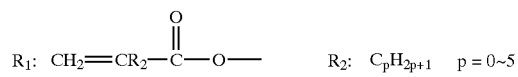

$R_1$: $CH_2=CR_2-\overset{O}{\underset{\|}{C}}-O-$  $R_2$: $C_pH_{2p+1}$  p = 0~5 j=1~6 m=0~500 n=4~500

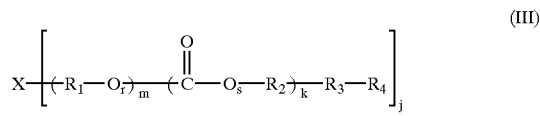
(III)

X: j-valent connecting group
$R_1$:—$C_pH_2p$— p=10
$R_2$:—$C_qH_2q$— q=10
$R_3$:—$C_tH_2t$— t=10

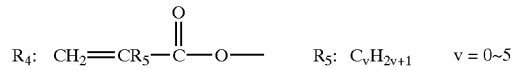

$R_4$: $CH_2=CR_5-\overset{O}{\underset{\|}{C}}-O-$  $R_5$: $C_vH_{2v+1}$  v = 0~5 r, s: s=1 when r=0, s=0 when r=1
J=1~6 k=0~3 m=0~20

Example of X (j-valent connecting group) (IV)

$C_xH_yF_z$— x=1~10, y+z=2x+1
—$C_xH_yF_z$— x=1~10, y+z=2x
—$C_xH_yF_z$< x=1~10, y+z=2x−1
>$C_xH_yF_z$< x=1~10, y+z=2x−2
—$CH_2O$—

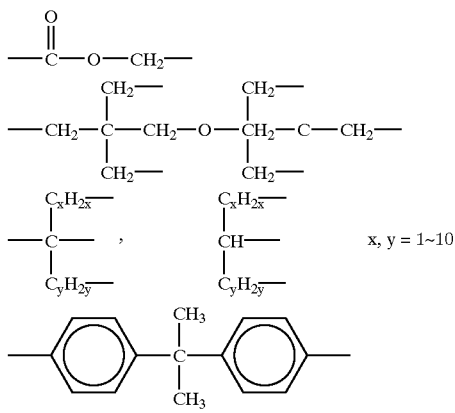

The above-mentioned organic polymer preferably contains the first chemical structure in its molecule at a rate smaller than or equal to 75 wt %. In particular, it is preferable to use a containing rate ranging from 25 to 60 wt %. A containing rate of the first chemical structure larger than 75 wt % is not preferable because the whole property of the organic polymer becomes to be governed by the property represented by the first chemical structure.

The organic polymer is preferably formed by polymerizing the organic monomer with irradiation of ionizing radiation.

BEST MODE FOR CARRYING OUT THE INVENTION

Embodiment 1

Figure 1:
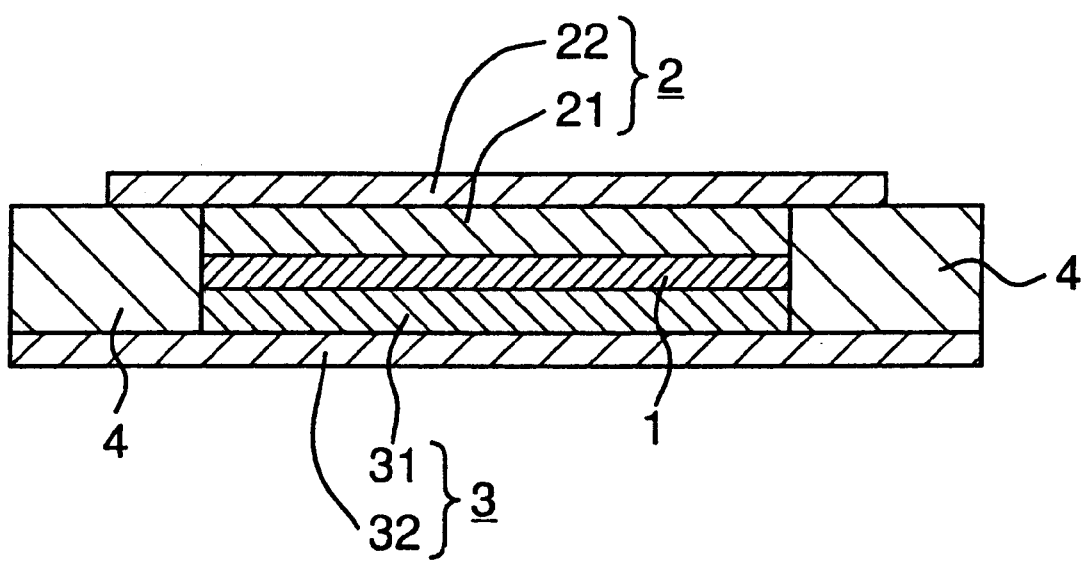
FIG. 1 is a vertical sectional view of a film-type lithium secondary battery of this invention.

FIG. 1 is the vertical sectional view of the film-type lithium secondary battery of this invention. In this battery, a positive electrode 2 and a negative electrode 3 are opposed each other through a separator 1. The positive electrode 2 is so constructed that a cathode composite 21 is combined with a positive current collector 22 composed of an aluminum foil, and a negative electrode 3 is so constructed that an anode composite 31 is combined with a negative current collector 32 composed of a copper foil. Ends of laminated portions composed of the cathode composite 21, the separator 1 and the anode composite 31 are sealed by an adhesives 4. In the battery of this embodiment, an electrolyte composing the separator 1 is improved.

The cathode composite 21 has a major component of a positive active material, and includes a liquid electrolyte, a conductive agent and a binder. Lithium cobalt oxide is used for the positive active material. The liquid electrolyte is formed by dissolving $LiBF_4$ of 1 mol/l into γ-butyrolactone. Polyvinylidene fluoride is used for the binder.

The anode composite 31 has a major component of a negative active material, and includes a liquid electrolyte and a binder. Carbon is used for the negative active material. Materials identical with those of the cathode composite 21 are used for the liquid electrolyte and the binder.

The separator 1 is composed of the electrolyte, and this electrolyte is in a state of solid or gel composed of a liquid electrolyte and an organic polymer. The organic polymer is formed by polymerizing an organic monomer expressed by the equation (V). The organic monomer expressed by the equation (V) is an acrylate monomer having the acrylic group at its molecular chain end. The separator 1 is formed by mixing the liquid electrolyte with the organic monomer of the equation (V), applying the mixture on the cathode composite 21, and polymerizing the organic monomer by irradiation of electron beam.

(V)

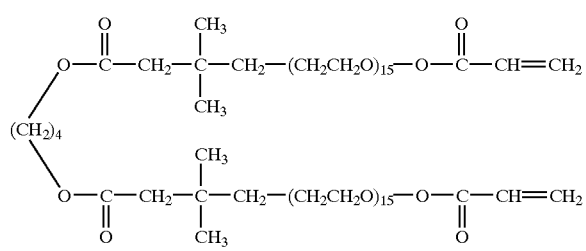

The film-type lithium secondary battery having a capacity of 10 mAh thus made up was named as an invention battery A.

Using materials same as those of the invention battery A except for the organic monomer which was replaced by the compound expressed by the equation (VI), a film-type lithium secondary battery having a capacity of 10 mAh was made up. This battery was named as an invention battery B.

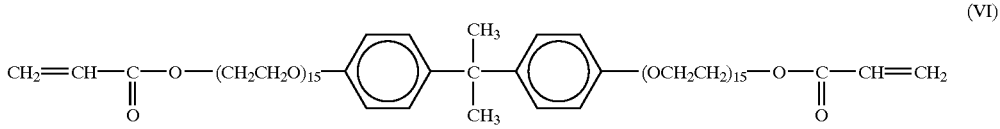

(VI)

Using materials same as those of the invention battery A except for the organic monomer which was replaced by the compound expressed by the equation (VII), a film-type lithium secondary battery having a capacity of 10 mAh was made up. This battery was named as an invention battery C.

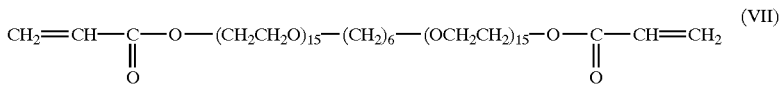

(VII)

Using materials same as those of the invention battery A except for the organic monomer which was replaced by a mixture of two kinds of the compound expressed by the equation (VIII) and the compound expressed by the equation (XI), a film-type lithium secondary battery having a capacity of 10 mAh was made up. This battery was named as an invention battery D. A mixing ration of the two kinds of organic monomers was 1:1 in weight ratio.

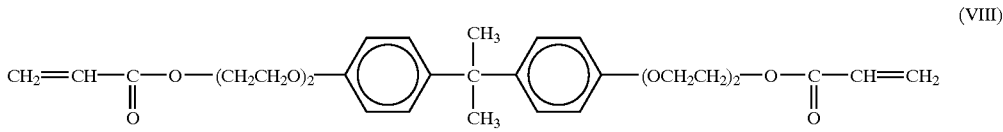

(VIII)

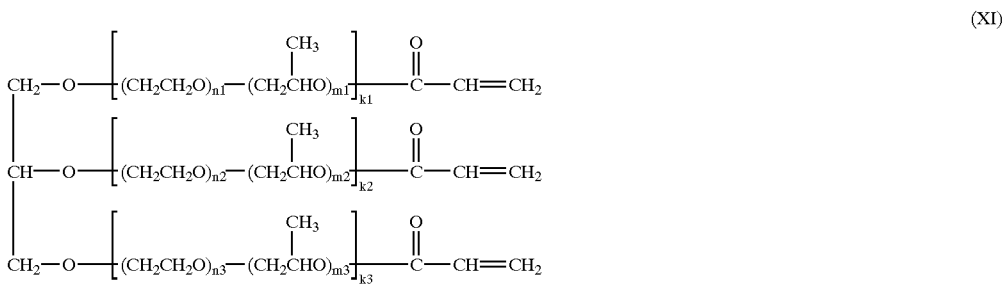

(XI)

respective mean values of n1+m1, n2+m2, n3+m3 are larger than or equal to 35.

k1=1~40, k2=1~40, k3=1~40

Using materials same as those of the invention battery A except for the organic monomer which was replaced by a mixture of two kinds of the compound expressed by the equation (IX) and the compound expressed by the equation (XI), a film-type lithium secondary battery having a capacity of 10 mAh was made up. This battery was named as an invention battery E. A mixing ration of the two kinds of organic monomers was 1:1 in weight ratio.

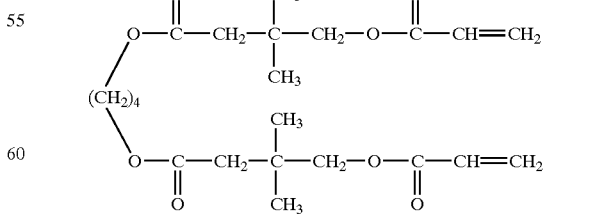

(IX)

Using materials same as those of the invention battery A except for the organic monomer which was replaced by a mixture of two kinds of the compound expressed by the equation (X) and the compound expressed by the equation (XI), a film-type lithium secondary battery having a capacity of 10 mAh was made up. This battery was named as an invention battery F. A mixing ration of the two kinds of organic monomers was 1:1 in weight ratio.

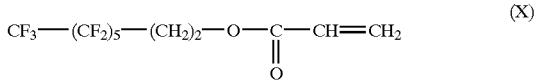
(X)

Using materials same as those of the invention battery A except for the organic monomer which was replaced by the compound expressed by the equation (IX), a film-type lithium secondary battery having a capacity of 10 mAh was made up. This battery was named as a comparison battery G.

Using materials same as those of the invention battery A except for the organic monomer which was replaced by the compound expressed by the equation (XI), a film-type lithium secondary battery having a capacity of 10 mAh was made up. This battery was named as a comparison battery H.

[Ionic Conductivity and Liquid Electrolyte Permeability]

Ion conductivities at 20° C. of electrolytes used in respective invention batteries A through F and comparison batteries G & H, are as listed in Table 1. The liquid electrolyte is also listed in the table. Liquid-holding abilities of the electrolytes used in respective batteries A through F and comparison batteries G & H were evaluated, and results are listed in Table 1. The evaluation was done by judging whether or not the liquid electrolyte permeated from the organic polymers leaving the organic polymers as they were for 24 hours after forming them.

TABLE 1

| Battery | Ionic conductivity of electrolyte (S · cm$^{-1}$) | Liquid electrolyte permeability |
|---|---|---|
| A | 3.5 × 10$^{-3}$ | Not recognized |
| B | 2.8 × 10$^{-3}$ | Not recognized |
| C | 3.6 × 10$^{-3}$ | Slightly recognized |
| D | 3.4 × 10$^{-3}$ | Not recognized |
| E | 3.0 × 10$^{-3}$ | Not recognized |
| F | 3.3 × 10$^{-3}$ | Not recognized |
| G | 3.0 × 10$^{-3}$ | Recognized |
| H | 2.8 × 10$^{-3}$ | Not recognized |
| Electrolytic solution | 7.3 × 10$^{-3}$ | — |

As obvious from Table 1, the ion conductivities of electrolytes used respectively in the invention batteries A through F were at a level sufficient for functioning as a battery.

[Relation Between Discharge Current and Discharge Capacity]

Figure 2:
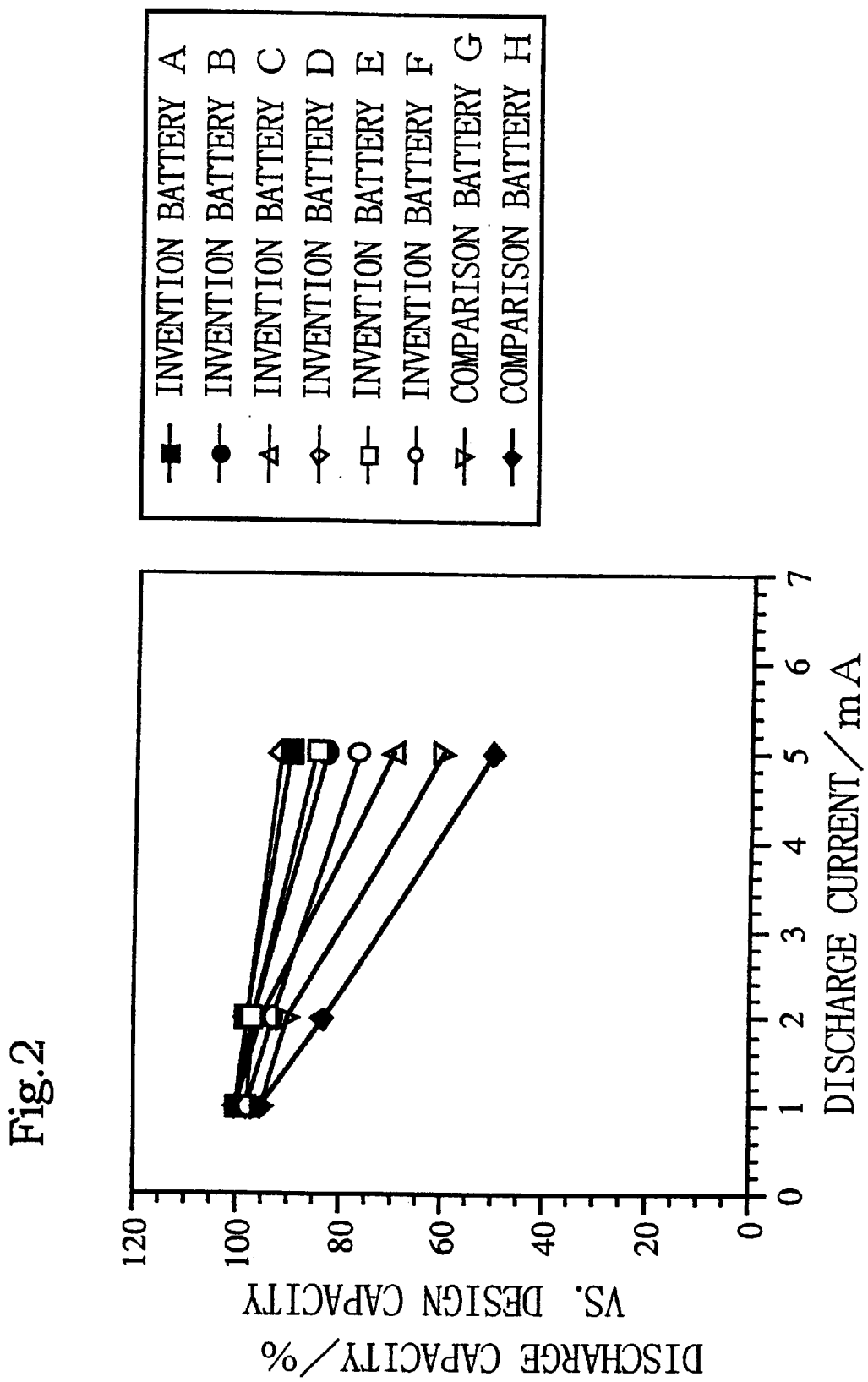
FIG. 2 is a graph showing relations between discharge currents and discharge capacities of respective batteries in Embodiment 1.

Discharge tests were carried out at various current values on the invention batteries A through F and the comparison batteries G & H, so that relations between the discharge current and the discharge capacity were measured. Results are shown in FIG. 2. These batteries were subjected to the tests under conditions that charging was done with a current of 1 mA (equivalent to 0.1 CmA) at a temperature of 20° C. up to a final voltage of 4.2 V, and then discharging was done with various values of current up to a final voltage of 2.7 V.

As seen from FIG. 2, when the discharge current was 1 mA, all of the invention batteries A through F and the comparison batteries G & H could attain discharge capacities of about 95 to 100% of the design capacity. However, when the discharge current was 5 mA, the invention batteries A through F could attain discharge capacities of 70 to 90% of the design capacity, but the comparison battery G attained 60% of the design capacity and the comparison battery H attained only around 50% of the design capacity.

Reasons for these results may be considered as follows.

In the comparison battery H, only the "first chemical structure" is contained in a large volume within the molecule of the organic polymer in the electrolyte. The "first chemical structure" means at least one of the ethylene oxide structure and the propylene oxide structure. This structure have a high affinity for the liquid electrolyte and a property to restrict the lithium ion. For this reason, a degree of transfer of the lithium ion is small during charging and discharging, and a supply of the lithium ion to the positive active material becomes insufficient at time when the discharge rate becomes large. Therefore, a lowering of capacity especially at high-rate discharge occurs due to lack of the lithium ion in the active material. In the comparison battery G, the "second chemical structure" is contained in the molecule of the organic polymer in the electrolyte. The "second chemical structure" means at least one kind of structure selected from the alkyl structure, the fluoroalkyl structure, the venzene skeleton, the ether group and the ester group. Among these structures, the ether group and the ester group have a comparatively low affinity for the liquid electrolyte, and have comparatively no property to restrict the lithium ion. The alkyl structure, the fluoroalkyl structure and venzene skeleton (bisphenol structure, for example) have a further low affinity for the liquid electrolyte, and have no property to restrict the lithium ion. Here, the ester group and the alkyl structure are contained, so that the degree of transfer of the lithium ion is large but the liquid-holding ability is poor. Consequently, the liquid electrolyte in battery system becomes short to cause the lowering of capacity especially at time of high-rate discharge.

On the contrary, in case of the invention batteries A through F, not only the "first chemical structure" but also the "second chemical structure" are contained in the molecule of organic polymer in the electrolyte. For this reason, the degree of transfer of the lithium ion is comparatively large during charge and discharge, and the supply of the lithium ion to the positive active material is sufficient at time when the discharge rate becomes large. Therefore, the lowering of capacity does not occur because there is no chance for the lithium ion in the active material to become short.

[Relation Between Cycle Number and Discharge Capacity]

Figure 3:
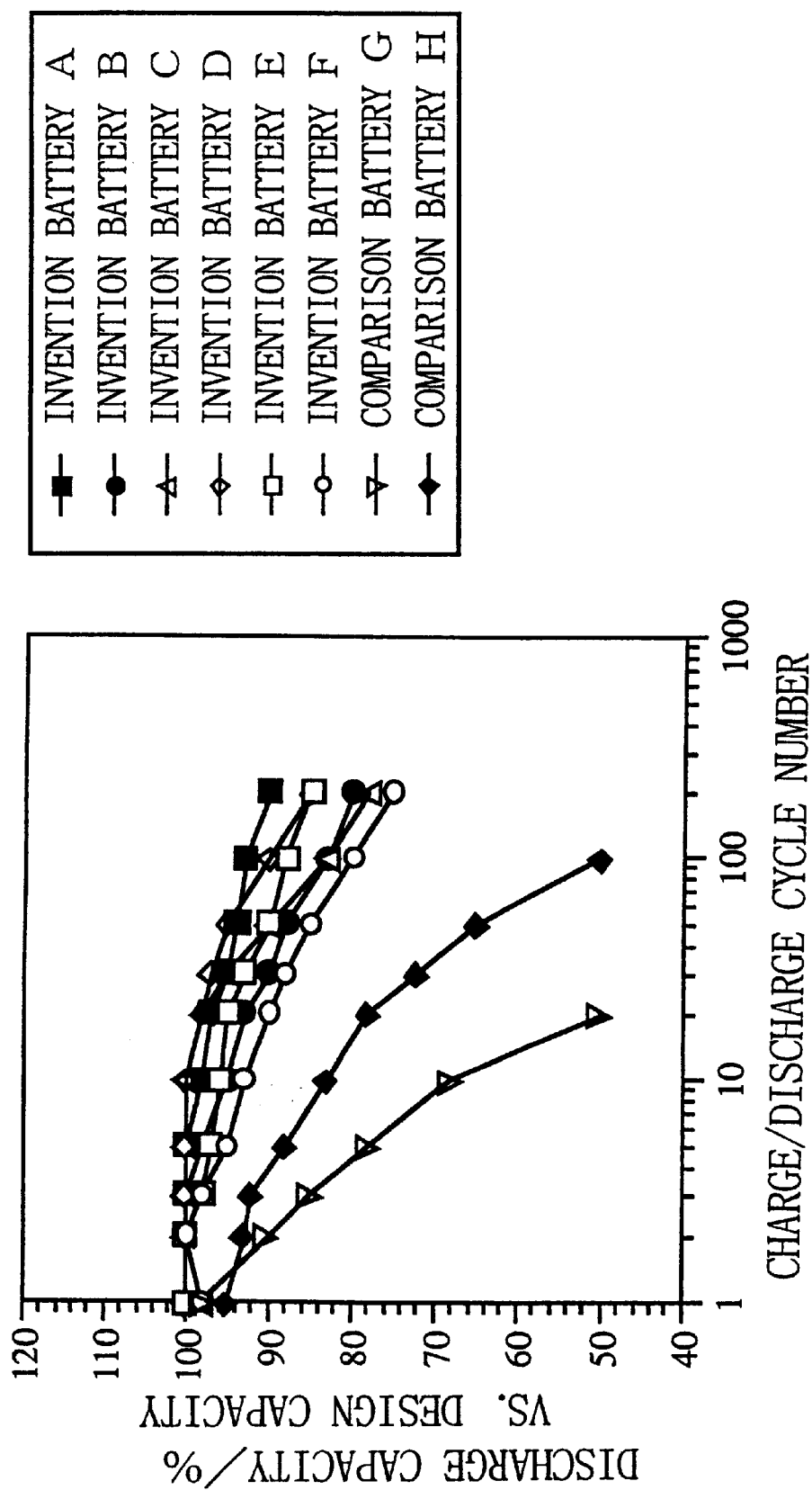
FIG. 3 is a graph showing relations between cycle numbers and discharge capacities of respective batteries in Embodiment 1.

Charge/discharge cycle tests were carried out on the invention batteries A through F and the comparison batteries G & H, so that relations between the cycle number and the discharge capacity were measured. Results are shown in FIG. 3. These batteries were subjected to the tests under conditions that charging was done with a current of 1 mA at a temperature of 20° C. up to a final voltage of 4.2 V, and then discharging was done with a current of 1 mA up to a final voltage of 2.7 V.

As seen from FIG. 3, the invention batteries A through F could attain discharge capacities of approximately 100% of the design capacity from the initial stage of charge/discharge. Even after elapse of 200 cycles, discharge capacities larger than or equal to 75% of the design capacity could be maintained although a slight lowering of capacity was recognized. Namely, it can be understood that the invention batteries A through F work well as a battery. On the other hand, the comparison batteries G & H could attain discharge capacities of about 95 to 100% of the design capacity at the initial stage of charge/discharge. However, in case of the comparison battery G, its capacity abruptly lowered with an elapse of cycle and fell below 50% of the design capacity at 20th cycle. In case of the comparison battery H, its capacity gradually dropped with an elapse of cycle and falls below 50% of the design capacity at 100th cycle.

Reasons for these results may be considered as follows.

In case of the comparison battery G, the ester group and the alkyl structure forming the "second chemical structure" are contained in the molecule of the organic polymer in the electrolyte, so that its liquid-holding ability is poor. For this reason, the liquid electrolyte leaks to outside of the battery system and the liquid electrolyte in the battery system becomes short to cause an abrupt lowering of the capacity. In case of the comparison battery H, only the "first chemical structure" is contained in a large volume within the molecule of organic polymer in the electrolyte, so that the degree of swelling of the electrolyte against the liquid electrolyte becomes large. For this reason, when the liquid electrolyte transfers induced by the transfer of the lithium ion at time of charge/discharge, the electrolyte gradually restricts the liquid electrolyte to swell so that the liquid electrolyte is taken out from active material layers of the both electrodes. Therefore, the liquid electrolyte in the active material becomes short with an elapse of cycle so as to cause the lowering of capacity.

On the contrary, in case of the invention batteries A through F, not only the "first chemical structure" but also the "second chemical structure" are contained in the molecule of organic polymer in the electrolyte, so that the degree of swelling against the liquid electrolyte is comparatively small. For this reason, since the electrolyte does not restrict the liquid electrolyte even when the liquid electrolyte transfers induced by the transfer of the lithium ion at time of charge/discharge, a sufficient amount of the liquid electrolyte can be maintained in the active material even after progress of the cycle. Therefore, the lowering of capacity due to progress of the cycle can be controlled.

[Ionic Conductivity and Liquid Electrolyte Permeability in Relation to Organic Monomer Mixing Ratio]

Using materials same as those of the invention battery D except for the mixing ratio of the two kinds of organic monomers (equation (VIII) and equation (XI)) used in the invention battery D, the mixing ratios were variously changed so as to make up the film-type lithium secondary batteries. The ion conductivities were measured on respective batteries at 20° C. and the liquid-holding abilities were evaluated in the same manner as Table 1. Results are listed in Table 2.

TABLE 2

| Mixing ratio (Weight ratio) | | Ionic conductivity of electrolyte ($S \cdot cm^{-1}$) | Liquid electrolyte permeability |
|---|---|---|---|
| Equation [VIII] | Equation [XI] | | |
| 100 | 0 | $3.2 \times 10^{-3}$ | Recognized |
| 90 | 10 | $3.3 \times 10^{-3}$ | Recognized |
| 80 | 20 | $3.2 \times 10^{-3}$ | Slightly recognized |
| 75 | 25 | $3.0 \times 10^{-3}$ | Slightly recognized |
| 50 | 50 | $3.4 \times 10^{-3}$ | Not recognized |
| 40 | 60 | $3.3 \times 10^{-3}$ | Not recognized |
| 25 | 75 | $3.0 \times 10^{-3}$ | Not recognized |
| 10 | 90 | $2.6 \times 10^{-3}$ | Not recognized |
| 0 | 100 | $2.8 \times 10^{-3}$ | Not recognized |

As obvious from Table 2, the degree of transfer of lithium ion is improved, when a mixing amount of the organic polymer expressed by equation (XI) containing the "first chemical structure" only is smaller than or equal to 75 wt % and especially when it is smaller than or equal to 60 wt %. While, the liquid-holding ability of the liquid electrolyte becomes poor a little when the above mixing amount is smaller than or equal to 25 wt %. Accordingly, it is desired that a content of the "First chemical structure" having a large affinity for the liquid electrolyte in the organic polymer is smaller than or equal to 75 wt %, in particular that the content is larger than or equal to 25 wt % and smaller than or equal to 60 wt %.

Embodiment 2

In a battery of this embodiment, an electrolyte contained in the positive electrode 2 and the negative electrode 3 are improved. Its fundamental composition is identical with that of Embodiment 1 as shown by FIG. 1.

The cathode composite 21 has a major component of the positive active material, and includes the liquid electrolyte, the conductive agent and the binder. The positive active material, the liquid electrolyte and the conductive agent are identical with those of Embodiment 1. An organic polymer formed by polymerizing the organic monomer expressed by the equation (VI) is used for the binder. The organic monomer expressed by the equation (VI) is an acrylate monomer having the acrylic group at its chain end. The cathode composite 21 is formed by mixing a mixed solution, which is prepared by mixing the liquid electrolyte and the organic monomer expressed by the equation (VI), with another cathode composite materials (positive active material and conductive agent), by applying the mixture on the positive current collector 22, and by polymerizing the organic monomer by means of irradiation of electron beam. Therefore, the cathode composite 21 contains the electrolyte composed of the liquid electrolyte and the organic polymer.

The anode composite 31 has a major component of the negative active material, and includes the liquid electrolyte and the binder. The negative active material and the liquid electrolyte are identical with those of Embodiment 1. The binder is identical with that of the cathode composite 21, and the organic polymer formed by polymerizing the organic monomer expressed by the equation (VI) is used therefor. Accordingly, the anode composite 31 also contains the electrolyte composed of the liquid electrolyte and the organic polymer.

The separator 1 is composed of the electrolyte, and the electrolyte is in the state of solid and gel composed of the liquid electrolyte and the organic polymer. The organic polymer is formed by polymerizing the organic monomer expressed by the equation (XI). The organic monomer expressed by the equation (XI) is the acrylate monomer having the acrylic group at its chain end. The separator 1 is formed by mixing the liquid electrolyte with the organic monomer of the equation (XI), by applying the mixture on the cathode composite 21, and by polymerizing the organic monomer by means of irradiation of electron beam.

The film-type lithium secondary battery having a capacity of 10 mAh thus made up was named as an invention battery I.

Using materials same as those of the invention battery I except for the organic monomer for use in the cathode composite 21 and the anode composite 31, which was replaced by a mixture of two kinds of compounds expressed by the equation (VIII) and the equation (XI), a film-type lithium secondary battery having a capacity of 10 mAh was made up. This battery was named as an invention battery J. A mixing ratio of the two kinds of organic monomers was 1:1 in weight ratio.

Using materials same as those of the invention battery I except for the organic monomer for use in the cathode composite 21, which was replaced by a mixture of two kinds of compounds expressed by the equation (VIII) and the equation (XI), and except for the organic monomer for use in the anode composite 31, which was replaced only by the compound expressed by the equation (VIII), a film-type lithium secondary battery having a capacity of 10 mAh was made up. This battery was named as an invention battery K. A mixing ratio of the two kinds of organic monomers was 1:1 in weight ratio.

Using materials same as those of the invention battery I except for the organic monomer for use in the cathode composite 21, which was replaced only by the compound expressed by the equation (VIII), and except for the organic monomer for use in the anode composite 31, which was replaced by a mixture of two kinds of compounds expressed by the equation (VIII) and the equation (XI), a film-type lithium secondary battery having a capacity of 10 mAh was made up. This battery was named as an invention battery L. A mixing ratio of the two kinds of organic monomers was 1:1 in weight ratio.

Using materials same as those of the invention battery I except for the organic monomer for use in the cathode composite 21 and the anode composite 31, which was replaced only by the compound expressed by the equation (VIII), a film-type lithium secondary battery having a capacity of 10 mAh was made up. This battery was named as an invention battery M.

Using materials same as those of the invention battery I except for the organic monomer for use in the cathode composite 21 and the anode composite 31, which was replaced only by the compound expressed by the equation (XI), a film-type lithium secondary battery having a capacity of 10 mAh was made up. This battery was named as a comparison battery N.

Using materials same as those of the invention battery I except for the organic monomer for use in the cathode composite 21 and the anode composite 31, which was replaced only by the compound expressed by the equation (IX), a film-type lithium secondary battery having a capacity of 10 mAh was made up. This battery was named as a comparison battery O.

[Ionic Conductivity and Liquid Electrolyte Permeability]

Ion conductivities at 20° C. of electrolytes used for the positive electrode and the negative electrode respectively in the invention batteries I through M and the comparison batteries N & O, are as listed in Table 3. Liquid-holding abilities of the electrolytes used in the invention batteries I through M and the comparison batteries N & O were evaluated, and results are listed in Table 3. The evaluations were done in the same way as that of Embodiment 1.

TABLE 3

| Battery | Electrode | Monomer compound | Ionic conductivity (S · cm$^{-1}$) | Liquid electrolyte permeability |
|---|---|---|---|---|
| I | Positive electrode | Equation [VI] | $2.8 \times 10^{-3}$ | Not recognized |
|   | Negative electrode | Equation [VI] | $2.8 \times 10^{-3}$ | Not recognized |
| J | Positive electrode | Equation [VIII] Equation [XI] | $3.4 \times 10^{-3}$ | Not recognized |
|   | Negative electrode | Equation [VIII] Equation [XI] | $3.4 \times 10^{-3}$ | Not recognized |
| K | Positive electrode | Equation [VIII] Equation [XI] | $3.4 \times 10^{-3}$ | Not recognized |
|   | Negative electrode | Equation [VIII] | $3.2 \times 10^{-3}$ | Recognized |
| L | Positive electrode | Equation [VIII] | $3.2 \times 10^{-3}$ | Recognized |
|   | Negative electrode | Equation [VIII] Equation [XI] | $3.4 \times 10^{-3}$ | Not recognized |
| M | Positive electrode | Equation [VIII] | $3.2 \times 10^{-3}$ | Recognized |
|   | Negative electrode | Equation [VIII] | $3.2 \times 10^{-3}$ | Recognized |
| N | Positive electrode | Equation [XI] | $2.8 \times 10^{-3}$ | Not recognized |
|   | Negative electrode | Equation [XI] | $2.8 \times 10^{-3}$ | Not recognized |
| O | Positive electrode | Equation [IX] | $3.0 \times 10^{-3}$ | Not recognized |
|   | Negative electrode | Equation [IX] | $3.0 \times 10^{-3}$ | Not recognized |
| Electrolytic solution | | — | $7.3 \times 10^{-3}$ | — |

As obvious from Table 3, the ion conductivities of electrolytes for use in the positive electrode and the negative electrode of the invention batteries I through M attained such levels as sufficient for functioning as a battery.

[Relation Between Discharge Current and Discharge Capacity]

Figure 4:
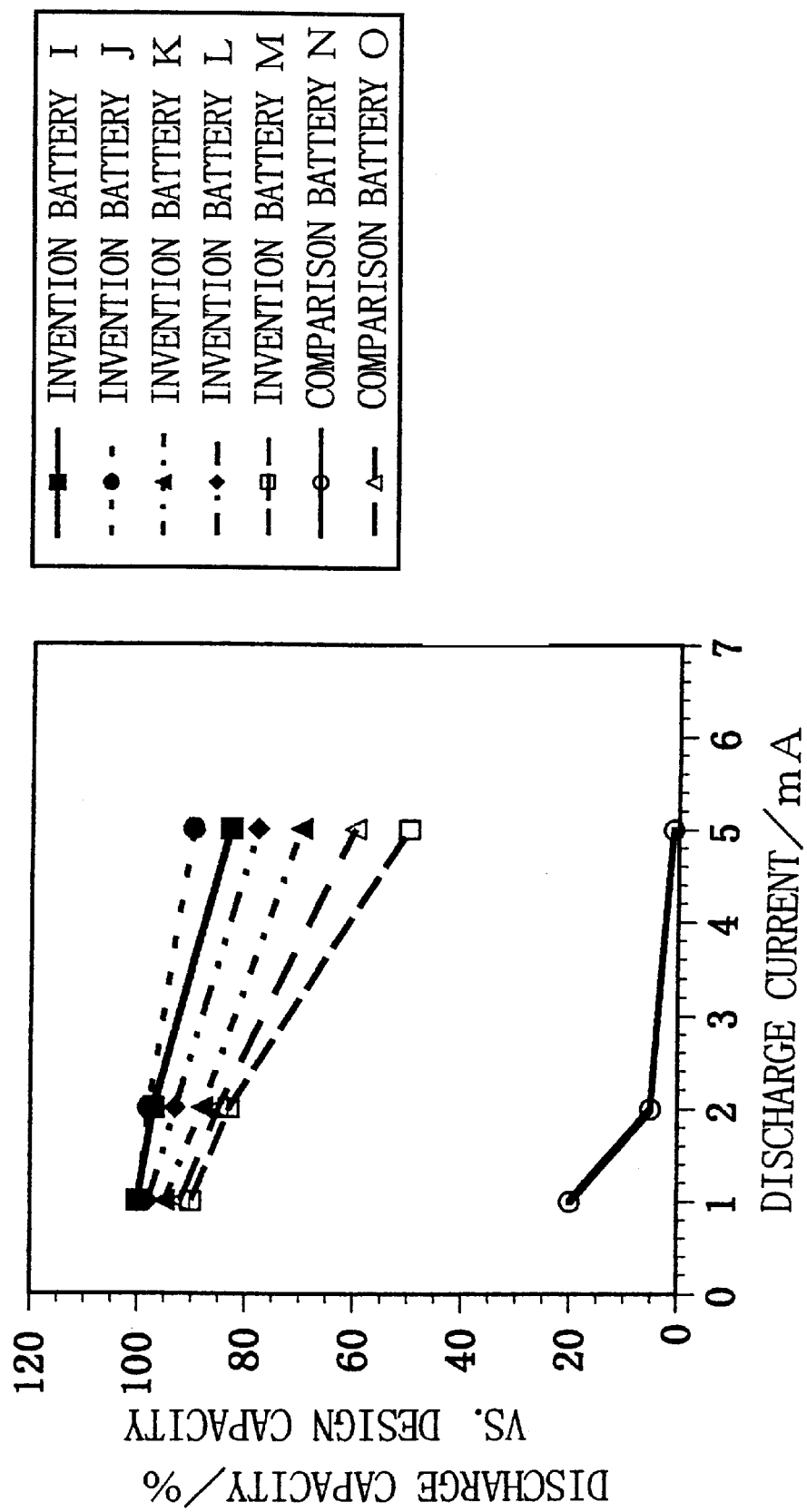
FIG. 4 is a graph showing relations between discharge currents and discharge capacities of respective batteries in Embodiment 2.

Discharge tests were carried out at various current values on the invention batteries I through M and the comparison batteries N & O, so that relations between the discharge current and the discharge capacity were measured. Results are shown in FIG. 4. These batteries were subjected to the tests under conditions that charging was done with a current of 1 mA (equivalent to 0.1 CmA) at a temperature of 20° C. up to a final voltage of 4.2 V, and then discharging was done with various values of current up to a final voltage of 2.7 V.

As seen from FIG. 4, when the discharge current was 1 mA, all of the invention batteries I through M and the comparison battery O could attain discharge capacities of about 90 to 100% of the design capacity, but the comparison battery N could attain a discharge capacity of only around 20% of the design capacity. When the discharge current was 5 mA, the invention batteries I through L could attain discharge capacities of 70 to 90% of the design capacity, but the comparison battery N could attain almost no discharge capacity and the comparison battery O could attain a discharge capacity of only around 60% of the design capacity.

Reasons for these results may be considered as follows.

In case of the comparison battery N, only the "first chemical structure" is contained in a large volume within the molecule of the organic polymer composing the electrolyte in the electrodes. The "first chemical structure" is identical with that of Embodiment 1. This structure has a high affinity for the liquid electrolyte and a property to restrict the lithium ion. For this reason, the electrolyte offers a large degree of swelling against the liquid electrolyte, so that the electrode composite are swelled by the liquid electrolyte at time of initial charging and the active material in the electrode is electronically isolated. Further, the degree of transfer of the lithium ion is small during charging and discharging, and the supply of the lithium ion to the positive active material becomes insufficient at time when the discharge rate becomes large. Therefore, the lithium ion in the active material becomes short to cause the lowering of capacity especially at time of the high-rate discharge. In case of the comparison battery O, the ester group and the alkyl structure forming the "second chemical structure" are contained in the molecule of the organic polymer composing the electrolyte in the electrodes. For this reason, the degree of transfer of the lithium ion is large but the liquid-holding ability is poor. Consequently, the liquid electrolyte in battery system becomes short to cause the lowering of capacity especially at time of the high-rate discharge.

On the contrary, in case of the invention batteries I through L, not only the "first chemical structure" but also the "second chemical structure" are contained in the molecule of organic polymer composing the electrolyte in the electrodes. The "second chemical structure" is identical with that of Embodiment 1. Among these structures, the ether group and the ester group have a comparatively low affinity for the liquid electrolyte, and have comparatively no property to restrict the lithium ion. The alkyl structure, the fluoroalkyl structure and venzene skeleton (bisphenol structure, for example) have a further low affinity for the liquid electrolyte, and have no property to restrict the lithium ion. For this reason, the degree of transfer of the lithium ion is comparatively large during charging and discharging, so that the supply of the lithium ion to the positive active material is sufficient at time when the discharge rate becomes large. Consequently, there is no chance for the lithium ion in the active material to become short and the lowering of capacity does not occur. In case of the invention battery M, a discharge capacity of only about 50% of the design capacity could be attained at time of 5 mA discharge current. The reason for this result may be considered as follows. Since the bisphenol structure ("second chemical structure") having a low affinity for the liquid electrolyte is contained in the molecule of organic polymer composing the electrolyte in the electrodes, the liquid-holding ability is poor although a small amount of the polyethylene oxide structure ("first chemical structure") is contained. For this reason, the liquid electrolyte in the battery system becomes short to cause the lowering of capacity especially at time of the high-rate discharge.

[Relation Between Cycle Number and Discharge Capacity]

Figure 5:
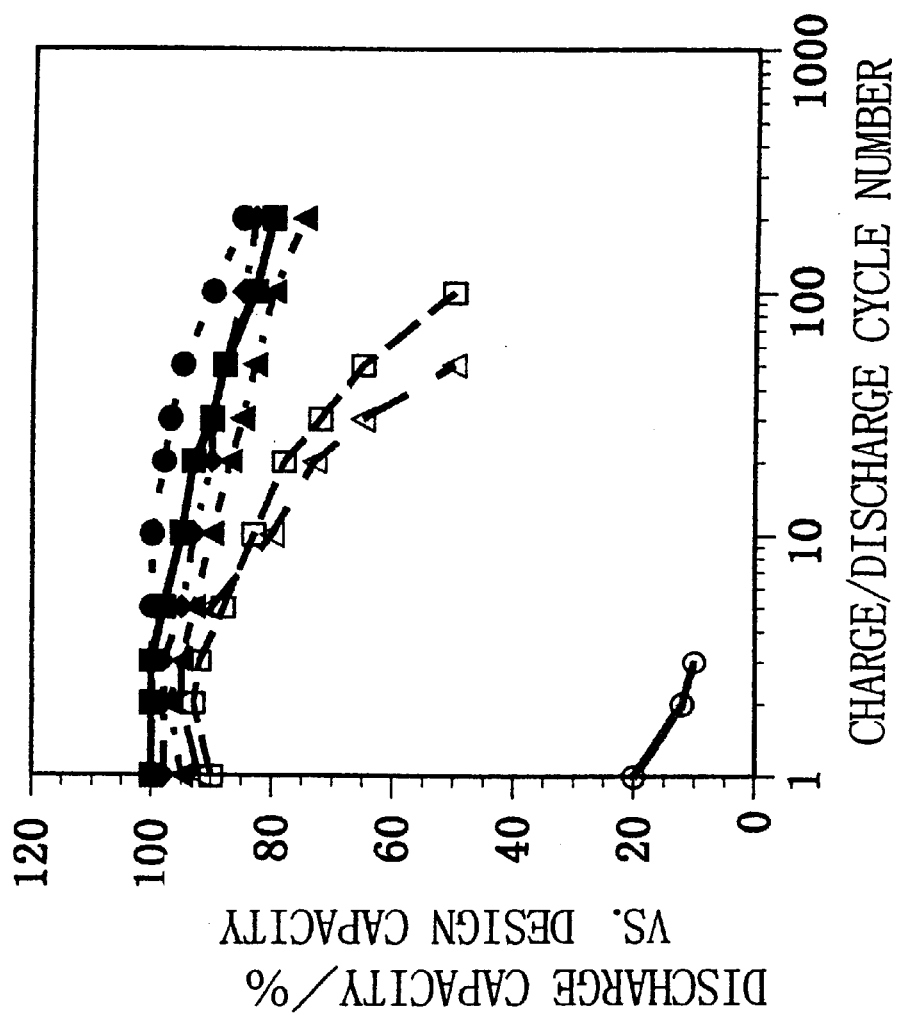
FIG. 5 is a graph showing relations between cycle numbers and discharge capacities of respective batteries in Embodiment 2.

Charge/discharge cycle tests were carried out on the invention batteries I through M and the comparison batteries N & O, so that relations between the cycle number and the discharge capacity were measured. Results are shown in FIG. 5. Theses batteries were subjected to the tests under conditions that charging was done with a current of 1 mA at a temperature of 20° C. up to a final voltage of 4.2 V, and then discharging was done with a current of 1 mA up to a final voltage of 2.7 V.

As seen from FIG. 5, the invention batteries I through L could attain discharge capacities of approximately 100% of the design capacity from the initial stage of charge/discharge. Even after elapse of 200 cycles, discharge capacities larger than or equal to 75% of the design capacity could be maintained although a slight lowering of capacity was recognized. Namely, it can be understood that the invention batteries I through L work well as a battery. However, the comparison battery N could attain a discharge capacity of only around 20% of the design capacity at the initial stage of charge/discharge, which fell below 10% of the design capacity at third cycle. The comparison battery O could attain a discharge capacity of approximately 90 to 100% of the design capacity at the initial stage of charge/discharge, but the capacity lowered with an elapse of cycle and fell below 50% of the design capacity at 50th cycle.

Reasons for these results may be considered as follows.

In case of the comparison battery N, only the "first chemical structure" is contained in a large volume within the molecule of organic polymer composing the electrolyte in the electrodes so that the degree of swelling of the electrolyte against the liquid electrolyte is large. For this reason, when the liquid electrolyte transfers induced by the transfer of the lithium ion at time of charge/discharge, the electrolyte gradually restricts the liquid electrolyte to swell and the electrode composite are swelled due to expansion and contraction of the active material. Therefore, the capacity abruptly lowers with an elapse of cycle. In case of the comparison battery O, the ester group and the alkyl structure forming the "second chemical structure" are contained in the molecule of the organic polymer composing the electrolyte in the electrodes, so that its liquid-holding ability is poor although the degree of transfer of the lithium ion is large. For this reason, the liquid electrolyte leaks to outside of the battery system and the liquid electrolyte in the battery system becomes short to cause the abrupt lowering of the capacity.

On the contrary, in case of the invention batteries I through L, not only the "first chemical structure" but also the "second chemical structure" are contained in the molecule of organic polymer composing the electrolyte in the electrodes, so that the degree of swelling of the electrolyte against the liquid electrolyte is comparatively small. For this reason, the electrolyte does not restrict the liquid electrolyte even when the liquid electrolyte transfers induced by the transfer of the lithium ion at time of charge/discharge, and the liquid electrolyte does not leak to outside of the battery system because the liquid-holding ability is maintained at a proper level. Therefore, a sufficient amount of the liquid electrolyte can be maintained in the active material of the both electrodes even after progress of the cycle, and the lowering of capacity due to progress of the cycle can be controlled. In case of the invention battery M, a discharge capacity of about 90 to 100% of the design capacity was obtained at the initial stage of charge/discharge.

However, the discharge capacity gradually lowered with an elapse of cycle and fell below 50% of the design capacity at 100th cycle. Reasons for this result is considered as follows. Since the bisphenol structure ("second chemical structure") having a low affinity for the liquid electrolyte is contained in the molecule of organic polymer composing the electrolyte in the electrodes, the liquid-holding ability is poor although a small amount of the polyethylene oxide structure ("first chemical structure") is contained therein. For this reason, the liquid electrolyte leaks to outside of the battery system, so that the liquid electrolyte in the battery system becomes short to cause the abrupt lowering of capacity

[Ionic Conductivity and Liquid Electrolyte Permeability in Relation to Organic Monomer Mixing Ratio]

Using materials same as those of the invention battery J except for the mixing ratio of the two kinds of organic monomers (equation (VIII) and equation (XI)) used in the both electrodes of the invention battery J, the film-type lithium secondary batteries were made up. The ion conductivities were measured on respective batteries at 20° C. and the liquid-holding abilities were evaluated in the same manner as Table 3. Results are listed in Table 4.

TABLE 4

| Mixing ratio (Weight ratio) | | Ionic conductivity of electrolyte ($S \cdot cm^{-1}$) | Liquid electrolyte permeability |
|---|---|---|---|
| Equation [VIII] | Equation [XI] | | |
| 100 | 0 | $3.2 \times 10^{-3}$ | Recognized |
| 90 | 10 | $3.3 \times 10^{-3}$ | Recognized |
| 80 | 20 | $3.2 \times 10^{-3}$ | Slightly recognized |
| 75 | 25 | $3.0 \times 10^{-3}$ | Slightly recognized |
| 50 | 50 | $3.4 \times 10^{-3}$ | Not recognized |
| 40 | 60 | $3.3 \times 10^{-3}$ | Not recognized |
| 25 | 75 | $3.0 \times 10^{-3}$ | Not recognized |
| 10 | 90 | $2.6 \times 10^{-3}$ | Not recognized |
| 0 | 100 | $2.8 \times 10^{-3}$ | Not recognized |

As seen from Table 4, the degree of transfer of the lithium ion is improved when the mixing amount of the organic monomer expressed by the equation (XI) containing only the "first chemical structure" is smaller than or equal to 75 wt %, especially when it is smaller than or equal to 60 wt %. While, when the mixing amount is smaller than 25 wt %, the liquid-holding ability of the liquid electrolyte in the electrode becomes slightly poor. Therefore, it is desirable that a content of the "first chemical structure" having the high affinity for the liquid electrolyte in the organic polymer is smaller than or equal to 75 wt %, especially that the content lies within a range of larger than or equal to 25 wt % and smaller than or equal to 60 wt %.

Another Embodiment (1) The organic polymer contained in the invention battery has the "first chemical structure" and the "second chemical structure". In the embodiments 1 & 2, as the "first chemical structure", references are made to the case containing only the ethylene oxide structure and the case containing both the ethylene oxide structure and the propylene oxide structure. However, reference may be made to a case containing only the propylene oxide structure. Same effect can be obtained even in this case too. However, since the propylene oxide structure has a lower affinity for the liquid electrolyte and a poorer property to restrict the lithium ion than those of the ethylene oxide structure, it is desirable to use a compound containing both of the ethylene oxide structure and the propylene oxide structure, expressed by the equation (XI), for the "first chemical structure".

(2) Only the electrolyte contained in the separator is improved in Embodiment 1, and only the electrolyte contained in the electrodes is improved in Embodiment 2. It will do to improve the electrolyte contained in the separator and one of the electrodes, or to improve the electrolyte contained in the separator and both of the electrodes.

INDUSTRIAL APPLICABILITY

This invention can provide a film-type lithium secondary battery, which can maintain an ionic conductivity of lithium ion in an electrolyte for use in an electrode or a separator, at a level sufficient for functioning as a battery. Further, it can provide a film-type lithium secondary battery which is superior in an initial capacity, a high-rate charge/discharge characteristic and a cycle life. Therefore, this invention can be utilized well in a battery industry.

What is claimed is:

1. A lithium secondary battery, comprising:
a positive electrode and a negative electrode opposed to each other;
a separator disposed between the positive electrode and the negative electrode; and
an electrolyte comprising a liquid electrolyte and an organic polymer,
wherein said electrolyte is contained within at least one of the positive electrode, the negative electrode, and the separator,
wherein the organic polymer contains a first chemical structure and a second chemical structure, the first chemical structure is at least one of an ethylene oxide structure or a propylene oxide structure, and the second chemical structure is

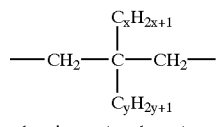

wherein x = 1 and y = 1, and wherein the organic polymer is formed by polymerizing an organic monomer having a polymerizable functional group at its molecular chain end.

2. The lithium secondary battery of claim 1, wherein only the separator contains said electrolyte.

3. A lithium secondary battery, comprising:
a positive electrode and a negative electrode opposed to each other;
a separator disposed between the positive electrode and the negative electrode; and
an electrolyte comprising a liquid electrolyte and an organic polymer,
wherein the positive electrode or the negative electrode contains said electrolyte,
wherein the organic polymer contains a first chemical structure and a second chemical structure, the first chemical structure is at least one of an ethylene oxide structure or a propylene oxide structure, and the second chemical structure is at least one connecting group selected from the group consisting of:

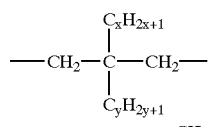 wherein x = 1 and y = 1, and

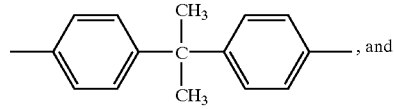, and wherein the organic polymer is formed by polymerzing an organic monomer having a polymerizable functional group at its molecular chain end.

4. A lithium secondary battery, comprising:
a positive electrode and a negative electrode opposed to each other;
a separator disposed between the positive electrode and the negative electrode; and
an electrolyte comprising a liquid electrolyte and an organic polymer,
wherein the positive electrode and the negative electrode contain said electrolyte,
wherein the organic polymer contains a first chemical structure and a second chemical structure, the first chemical structure is at least one of an ethylene oxide structure or a propylene oxide structure, and the second chemical structure is at least one connecting group selected from the group consisting of:

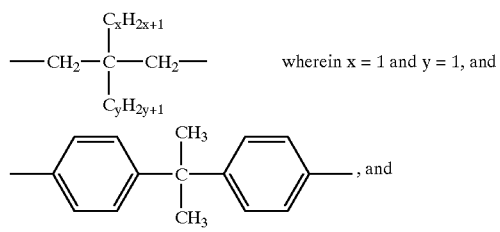

wherein x = 1 and y = 1, and wherein the organic polymer is formed by polymerizing an organic monomer having a polymerizable functional group at its molecular chain end.

5. A lithium secondary battery, comprising:
a positive electrode and a negative electrode opposed to each other;
a separator disposed between the positive electrode and the negative electrode; and
an electrolyte comprising a liquid electrolyte and an organic polymer,
wherein the separator and at least one of the positive electrode or the negative electrode contain said electrolyte,
wherein the organic polymer contains a first chemical structure and a second chemical structure, the first chemical structure is at least one of an ethylene oxide structure or a propylene oxide structure, and the second chemical structure is at least one connecting group selected from the group consisting of:

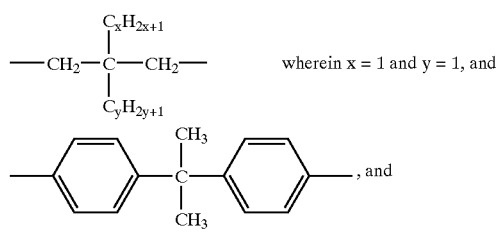

wherein x = 1 and y = 1, and wherein the organic polymer is formed by polymerizing an organic monomer having a polymerizable functional group at its molecular chain end.

6. A lithium secondary battery, comprising:
a positive electrode and a negative electrode opposed to each other;
a separator disposed between the positive electrode and the negative electrode; and
an electrolyte comprising a liquid electrolyte and an organic polymer,
wherein the positive electrode, the negative electrode, and the separator contain said electrolyte,
wherein the organic polymer contains a first chemical structure and a second chemical structure, the first chemical structure is at least one of an ethylene oxide structure or a propylene oxide structure, and the second chemical structure is at least one connecting group selected from the group consisting of:

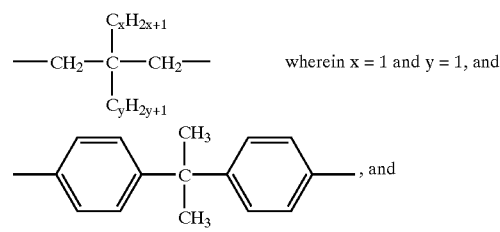

wherein x = 1 and y = 1, and wherein the organic polymer is formed by polymerizing an organic monomer having a polymerizable functional group at its molecular chain end.

7. The lithium secondary battery of any one of claims 1 and 3–6, wherein the organic monomer contains the first chemical structure and the second chemical structure.

8. The lithium secondary battery of any one of claims 1 and 3–6, wherein the organic monomer is a mixture of an organic monomer containing the first chemical structure and an organic monomer containing the second chemical structure.

9. The lithium secondary battery of any one of claims 1 and 3–6, wherein from above 0 to 75 wt % of the total wt % of the organic polymer is said first chemical structure.

10. The lithium secondary battery of any one of claims 1 and 3–6, wherein 25 to 60 wt % of the total wt % of the organic polymer is said first chemical structure.

11. The lithium secondary battery of any one of claims 1 and 3–6, wherein the organic polymer is formed by polymerizing the organic monomer by ionizing radiation.

* * * * *